July 9, 1963  W. F. BERGEN  3,096,973
DOCK BUMPER
Filed Jan. 27, 1961  2 Sheets-Sheet 1
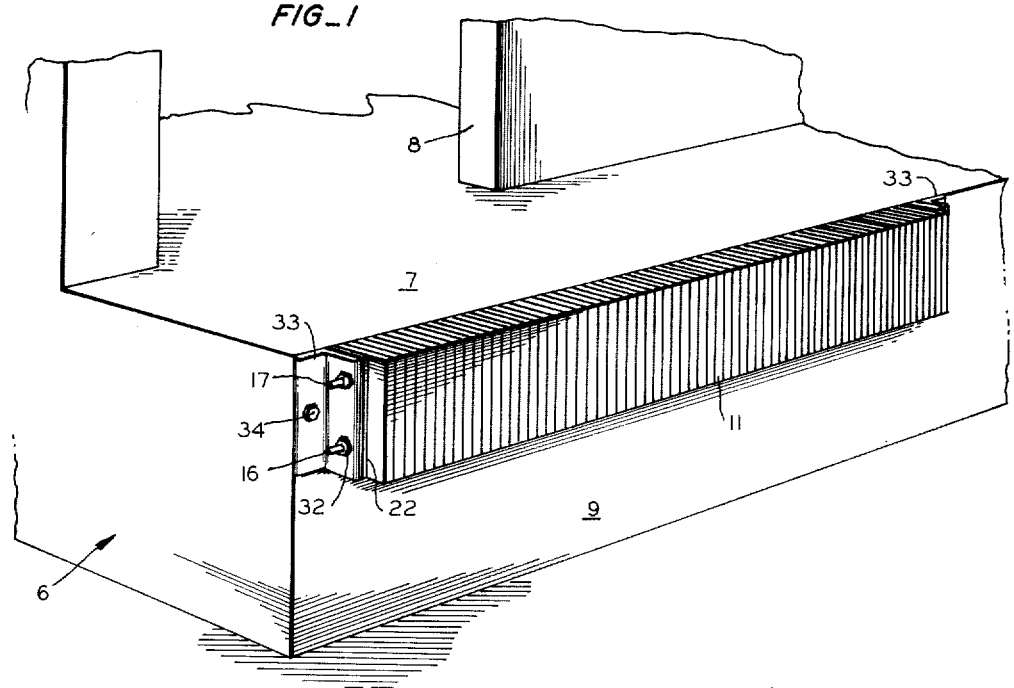
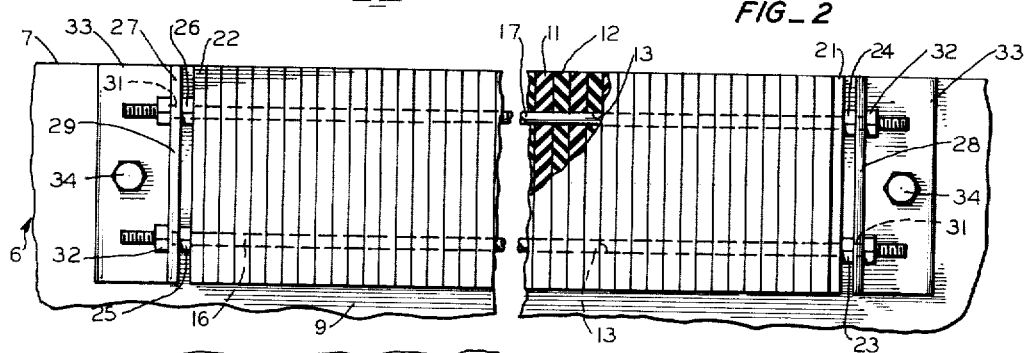
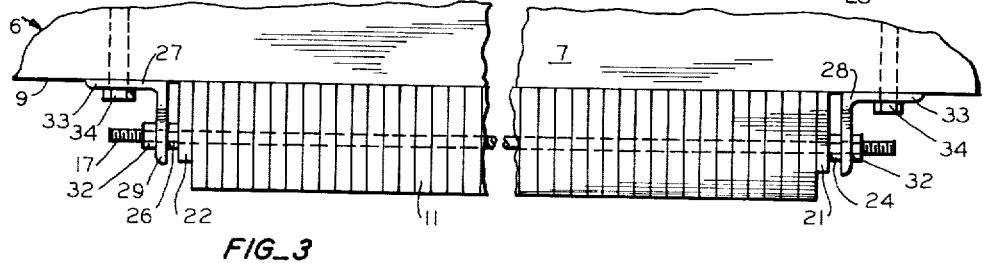
INVENTOR.
WALTER F. BERGEN
BY
Lothrop & West
ATTORNEYS July 9, 1963 W. F. BERGEN 3,096,973
DOCK BUMPER
Filed Jan. 27, 1961 2 Sheets-Sheet 2
FIG_4
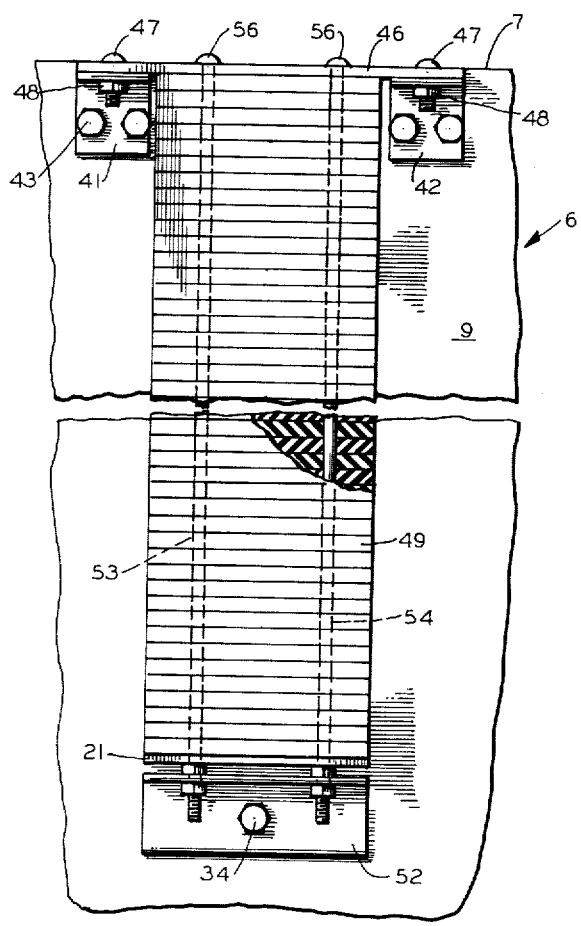
FIG_5
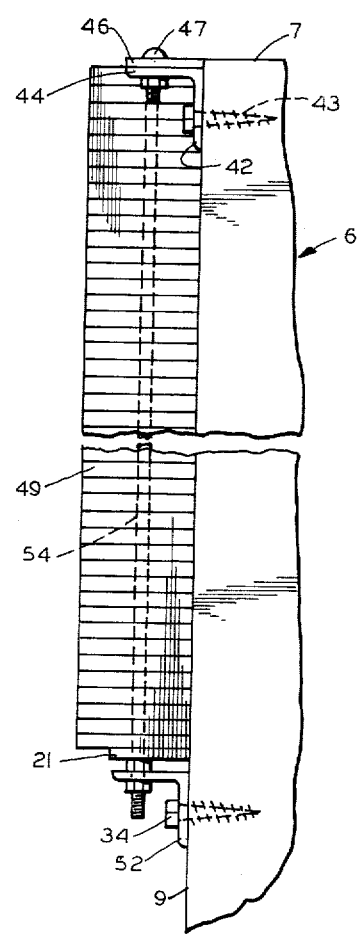
FIG_6
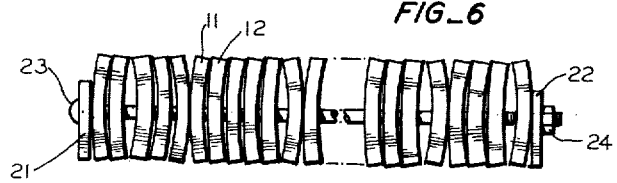
INVENTOR.
WALTER F. BERGEN
BY
*Lothrop & West*
ATTORNEYS

United States Patent Office 3,096,973
Patented July 9, 1963

3,096,973
DOCK BUMPER
Walter F. Bergen, Alamo, Calif., assignor to Pacific & Atlantic Shippers, Inc., doing business as Tyres Industries, a corporation of Illinois
Filed Jan. 27, 1961, Ser. No. 85,380
3 Claims. (Cl. 267—1)

My invention relates to devices particularly designed for use in connection with warehouses having loading docks against which truck or trailers are backed for the purpose of transferring lading. Usually such docks are arranged with a floor approximately at the level of the truck or trailer floor. The level of the truck or trailer floor varies with the amount of lading on the truck or trailer since the springs flex as the load changes. The dock is often fabricated of concrete or the like and is susceptible to considerable impact damage when the truck or trailer is first backed into position against the dock. In addition, the dock is susceptible to a good deal of abrasion and additional damage as the level of the truck or trailer floor varies during the loading or unloading operation.

It has been proposed to provide bumpers of various sorts for this purpose and a customary present practice is to install a wooden beam along the impact area of the dock. It is necessary for the wood to be replaced rather frequently since it has a relatively short life. Furthermore, the wood tends to disintegrate and to splinter, particularly under the rising and falling movement of the truck or trailer floor and a good deal of expense is incurred in maintaining the wooden dock bumpers in serviceable condition.

It is therefore an object of my invention to provide a dock bumper having a considerably increasing life over bumpers now available and which when worn out can be readily and easily replaced.

Another object of the invention is to provide a dock bumper which affords substantial resilience so as to avoid damage not only to the dock but also to the truck or trailer backing against it.

Another object of the invention is to provide a dock bumper which will be effective despite rising and falling movement of the truck or trailer body during the loading or unloading operation.

Another object of the invention is in general to provide an improved dock bumper.

Other objects of the invention together with the foregoing are attained in the embodiments of the invention described in the accompanying description and illustrated in the accompanying drawings in which:

FIGURE 1 is a perspective of a portion of a dock showing a dock bumper constructed pursuant to the invention and installed thereon;

FIGURE 2 is a front elevation of the dock bumper shown in FIGURE 1, a portion of the figure being broken away and some parts being omitted to reduce the figure size;

FIGURE 3 is a plan of the structure shown in FIGURE 2;

FIGURE 4 is a front elevation of a modified form of dock bumper constructed in accordance with the invention, a portion of the device being omitted and a portion being broken away for further disclosure;

FIGURE 5 is a side elevation of the structure illustrated in FIGURE 4; and

FIGURE 6 is a fragmentary, somewhat diagrammatic, view showing a stage in the assembly of a dock bumper pursuant to the invention.

While the device of the invention can be embodied in a number of different ways, it has been successfully put into practice in the forms illustrated herein. Considering first the installation illustrated in FIGURES 1, 2 and 3, there is ordinarily encountered a loading dock 6 having a loading floor 7 adjacent a doorway 8 and having a vertical face 9 against which the trucks or trailers are usually backed with the truck or trailer floor approximately level with the floor 7. Pursuant to the invention, there is provided to protect the dock and to afford an extension of the floor 7, a dock bumper preferably made up, as shown in FIGURE 6, of a plurality of bundles of laminations such as 11 and 12. These economically and conveniently are generally rectangular members cut from the side walls of discarded automobile or truck tires and so constitute sections of rubberized fabric. Preferably these reclaimed members are initially run through a scalping device (not shown) which removes most of the superficial rubber from the fabric. There remains a mass of fabric embedded in a rubber binder but with a good deal of fabric exposed on all faces and edges.

Because of their previous use, the laminations 11 and 12 often initially have a slight curvature in one or two directions. The laminations so provided are formed with apertures 13 therein, these apertures being conveniently located somewhat off center and usually being two in number. The apertures in all of the laminations are aligned so that the laminations can readily be formed into a bundle or a stack by sliding them individually or in groups over a pair of through rods 16 and 17, respectively. The rods are of a diameter to fit the apertures 13 with reasonable freedom. The rods 16 and 17 are considerably longer than the bundle of laminations and so extend for a substantial distance from both ends of the bundle. The rods conveniently are threaded for some distance at their opposite ends or can be threaded throughout if the expense is not substantially greater.

Also slipped onto the rods 16 and 17 are end plates 21 and 22 conveniently of metal and of slightly less area or extent than the laminations themselves. Supplementing the end plate, enlargements are provided on the rods 16 and 17. In the present instance the enlargements are nuts 23 and 24 disposed on the threaded portions at one end of the rod against the end plate 21 and are also nuts 25 and 26 threaded on the other ends of the rods against the end plate 22, as shown in FIGURES 1, 2 and 3.

During initial assembly, the nuts 23 and 24 as well as the nuts 25 and 26 are tightened so that the end plates 21 and 22 are compressed against the laminations which are themselves tightly pressed together. This forms virtually a solid bundle with the individual laminations 11 and 12 substantially straight or flat rather than curved. The use of the nuts to tighten the end plates against the remaining portion of the bundle obviates the necessity of utilizing a hydraulic press or temporary holder in assembling the laminations and the rods are placed under an initial tension. When the nuts are tight, a substantial amount of the through rods projects.

Engaging with the projecting threaded ends of the through rods 16 and 17 is a pair of angle irons 27 and 28. The angle irons are substantially identical and have projecting webs 29 with holes 31 therethrough to align with the openings and apertures of the end plates and laminations. The webs 29 are slid over the rods and are held in position by fastening members 32 so that the remaining webs 33 of the angle irons are substantially coplanar. These webs 33 are pierced to accommodate lag bolts 34 or the like for fastening the angle irons to the vetrical face 9 of the dock.

When an installation is made with the lag bolts 34 in position and with the angle irons appropriately secured in place, the rods 16 and 17 serve to support the laminations partly in abutment with the face 9 and partly exposed for contact by the approaching trucks and trailers. The laminations project substantially beyond the projection of the webs 29 of the angle irons and also beyond the extent of the end plates 21 and 22 so that there is no likelihood of metallic contact between the dock bumper and the adjacent vehicle. Preferably, the angle irons are spaced slightly from the nuts, such as 24, and upon installation, the nuts 32 are tightened. The rods 16 and 17 are thus placed under further tension and so are stiff and strong enough to support the laminations. When the laminations are installed substantially with their top surfaces substantially flush with the floor 7, the top of the dock bumper forms a substantial projection from and continuation of the floor of the dock.

After a time, when the bumper becomes sufficiently worn and disintegrated, it is easy to withdraw one of the lag bolts 34, to remove the nuts 32 and to withdraw the rod ends from the two angle irons so that the entire group or bundle of laminations can be removed. These are replaced by a similar unit and the operations are reversed to complete the installation of the new unit. This requires a very short time and can easily be accomplished. While under some circumstances the dock bumper after considerable use can be simply turned over to expose the face previously disposed against the surface 9, it is usually preferred to provide an entirely new unit.

In some cases the rising and falling movement of the truck and trailer bed while being loaded and unloaded is so great as to justify the use of a bumper substantially as shown in FIGURES 4 and 5. This device is precisely the same as previously described and illustrated in most respects but is designed to be installed vertically rather than horizontally. In this instance the face 9 of the dock is provided just below the floor level 7 with a pair of angle brackets 41 and 42 each secured by a suitable lag bolt 43. The angles have projecting webs 44 on which rest the extended parts of an end plate 46. The extended parts as well as the projecting webs of the angle brackets are suitably pierced to accommodate carriage bolt fasteners 47 having removable nuts 48 thereon. Thus it is possible to mount the bundle of bumper laminations 49 in a depending fashion with the lower ends of the through rods accommodated, as previously described, in a lower angle iron 52.

It is preferred to omit enlargements in the form of nuts from the uppermost ends of the through rods, but instead to provide the through rods 53 and 54 with rivet ends 56 to serve as stops against the end plate 46. The fabrication and installation of this dock bumper is substantially the same as previously described except that it can readily be removed after removal of the nuts 48 and the corresponding nuts 32 adjacent the angle iron 52. The bundle can then simply be lifted out of installed position, can be turned over or can be entirely replaced and the reinstallation made by a reversal of procedure.

What is claimed is:

1. A dock bumper for installation on a support having a vertical face comprising a bundle of laminations of rubberized fabric having apertures therein, end plates at the opposite ends of said bundle and having similar openings therein, rods with threaded ends passing through said apertures and said openings, nuts on said rods engaging said end plates and effective when tight to compress said end plates and said laminations together and to leave the ends of said rods projecting, angle irons adapted to abut said vertical face and having holes therein fitting over said projecting rod ends, and fasteners engaging said ends of said rods and urging said angle irons toward said nuts.

2. A dock bumper for installation on a support having a vertical face comprising a bundle of laminations of rubberized fabric having apertures therein, end plates at the opposite ends of said bundle and having similar openings therein, rods passing through said apertures and said openings, enlargement on said rods engaging said end plates, at least some of said enlargements being nuts engaging threaded end portions on said rods and effective when tight to compress said end plates and said laminations together and to leave said threaded end portions projecting, an angle iron adapted to abut said vertical face and having holes therein fitting over said projecting rod ends, fasteners engaging said ends of said rods and urging said angle iron toward said nut, and mounting means in addition to said angle iron for supporting said rods from said vertical face.

3. A dock bumper comprising a pair of planar end plates having openings therein, a plurality of laminations of resilient material interposed between said end plates, said laminations having apertures therein aligned with said openings, rods passing through said apertures and said openings, enlargements on said rods for compressing said end plates and said laminations together, angle irons disposed adjacent opposite ends of said rods, each of said angle irons having one of the webs thereof parallel to said end plates, and means for detachably relating said ones of the webs of said angle irons to said rods and against said enlargements to support said rods against displacement in all directions.

References Cited in the file of this patent

UNITED STATES PATENTS

| | | |
|---|---|---|
| Re. 24,276 | Schuyler | Feb. 12, 1957 |
| 1,981,182 | Lyons | Nov. 20, 1934 |

UNITED STATES PATENT OFFICE
CERTIFICATE OF CORRECTION

Patent No. 3,096,973      July 9, 1963

Walter F. Bergen

It is hereby certified that error appears in the above numbered patent requiring correction and that the said Letters Patent should read as corrected below.

In the grant, lines 2 and 12, and in the heading to the printed specification, line 4, for "Tyrcs" read -- Tyrco --.

Signed and sealed this 7th day of January 1964.

(SEAL)
Attest:
ERNEST W. SWIDER

Attesting Officer

EDWIN L. REYNOLDS

Acting Commissioner of Patents